W. M. BRADSHAW.
SPEED CHANGING DEVICE.
APPLICATION FILED SEPT. 20, 1906.

963,743.

Patented July 12, 1910.

2 SHEETS—SHEET 1.

WITNESSES:

C. L. Belcher
Otto J. Schairer

INVENTOR
William M. Bradshaw

BY
ATTORNEY

W. M. BRADSHAW.
SPEED CHANGING DEVICE.
APPLICATION FILED SEPT. 20, 1906.

963,743.

Patented July 12, 1910.
2 SHEETS—SHEET 2.

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

SPEED-CHANGING DEVICE.

963,743.

Specification of Letters Patent. Patented July 12, 1910.

Application filed September 20, 1906. Serial No. 335,511.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Speed-Changing Devices, of which the following is a specification.

My invention relates to measuring instruments and similar devices and particularly to the gearing that is usually employed therein for the purpose of transmitting motion to one or more indicators.

The object of my invention is to so construct and arrange the gearing of measuring instruments that that portion which operates the indicating mechanism may be mounted independently of and be separable from the portion that is employed solely for speed-changing purposes.

In electrical measuring instruments, as heretofore constructed, all of the gearing that is interposed between the movable member and the indicating devices is comprised in a single train the removal of which from the instrument disturbs the delicately adjusted connection thereof with the pinion carried by the movable member. In order to avoid disturbance of the said connection, while at the same time permitting of stopping of the motion of the counting or indicating mechanism, I propose to mount the gearing that operates the indicating devices independently of that which effects speed reduction and is connected to the movable member, and to provide further a connection between the two trains of gearing that does not require the accuracy or delicacy of adjustment for successful operation as the connection between the speed reducing gearing and the shaft of the instrument.

Figure 1:
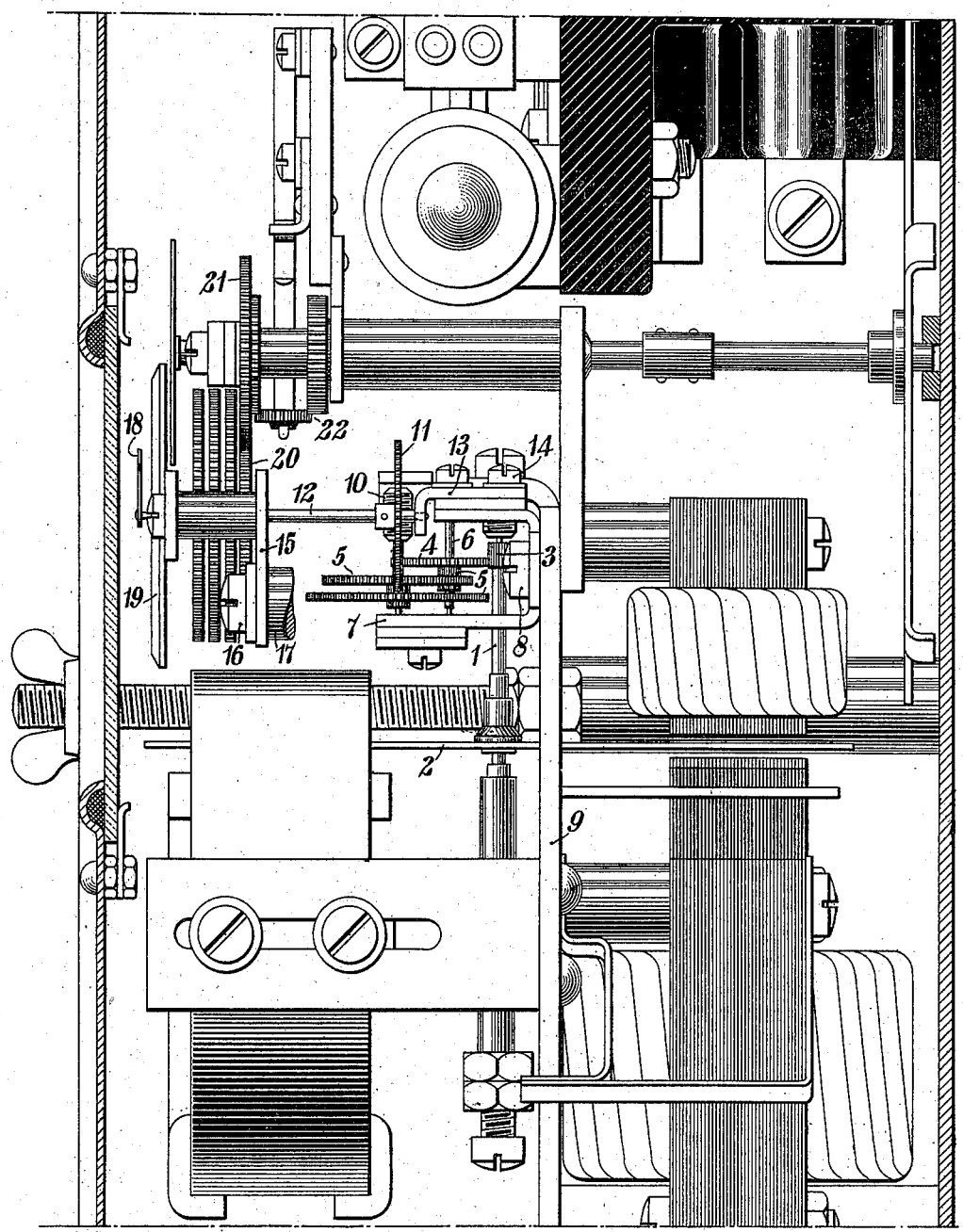
Figure 2:
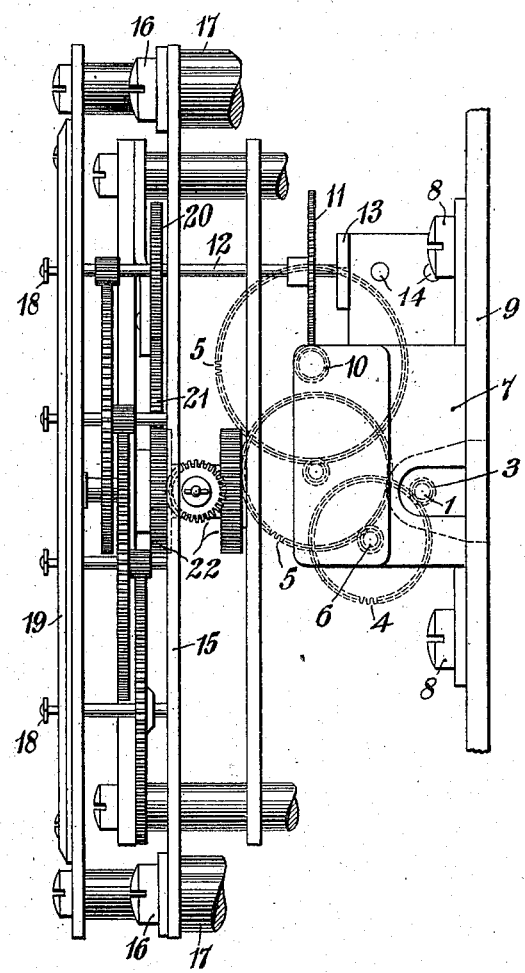

Figure 1 of the accompanying drawing is a view, partially in section and partially in elevation, of a portion of an electrical measuring instrument that embodies my invention, and Fig. 2 is a bottom plan view of the reduction and indicating mechanism gearing that are separated from the instrument of Fig. 1.

The upper end of a shaft 1 upon which is mounted a movable member 2 of an electrical measuring instrument, that may be of the character set forth in an application Serial No. 243,739, filed by me February 1, 1905, is provided with a pinion 3 that engages a gear wheel 4. The gear wheel 4 is the first of a set or train of intermeshing gear wheels and pinions 5 that are employed solely for speed-changing purposes and that are mounted upon shafts 6 in a substantially U-shaped bracket 7, screws 8 being employed to secure the bracket to a supporting frame 9. The shafts 6 are, in the present instance, mounted in the bracket 7, in a manner substantially like that set forth in another application, Serial No. 355,512, filed by me of even date herewith, though, if desired, they may be mounted in any other suitable manner. The last gear of the train is a screw or worm 10, and it meshes with a worm wheel 11 that is mounted upon a shaft 12 very close to the end that has a bearing in an extension 13 of the bracket 7 to which it is secured by means of tap screws 14. The shaft 12 has bearings at its other end in a frame 15 that is secured by means of tap screws 16 to posts 17, constituting parts of the framework of the instrument. The frame 15 provides mountings for a train of gear wheels and pinions that operates pointers 18 over dials formed or printed upon the face of a plate 19 secured upon the front of the frame 15, the pointers 18 serving to indicate the number of rotations of the shaft 1.

The instrument in connection with which the invention is here employed is substantially like that set forth in Patent No. 757,439, granted to Westinghouse Electric & Manufacturing Company, as assignee of Frank Conrad, and connection of the gearing just described with the prepayment mechanism is afforded by means of a gear 20 that is mounted upon the shaft 12 and meshes with another gear 21 for operating a set of differential gears 22 of the said mechanism. Inasmuch as the invention is in no way limited in its application to instruments of this type, or to prepayment instruments in general, it is deemed unnecessary to further describe the prepayment mechanism.

Since the train of gears 5 is here employed only for speed-changing purposes, occasion will seldom arise for removing the same from the instrument or otherwise disturbing the delicately adjusted connection between the pinion 3 and the gear wheel 4, and the supporting bracket 7 therefor is consequently formed separately from and mounted independently of the frame 15 containing the counting train which it is frequently necessary to remove from the instrument.

In removing and replacing the frame 15 in which the counting train is mounted, only a very slight displacement of the gear 11 with respect to the worm 10 may arise, since the gear 11 is placed very close to the end of the shaft that has a bearing in the arm 13, and therefore but little care need be exercised in adjusting this connection.

I claim as my invention:

1. The combination with a rotatable member, a train of gearing operated thereby and a supporting frame for the gearing, of a second train of gearing having the axes of its members at right angles to the axes of the members of the first train, a supporting frame for the second train mounted independently of the first frame, a shaft having bearings in both of said frames, and gear connections between the opposite ends thereof and the respective trains, one of which is separable.

2. The combination with a rotatable member, a train of gearing operated thereby and a supporting frame for the gearing, of a second train of gearing, a supporting frame therefor mounted independently of the first frame, a shaft having bearings in both of said frames, and an operative connection with the second train, and a separable worm and gear connection between the shaft and the first train.

In testimony whereof, I have hereunto subscribed my name this 13th day of September, 1906.

WILLIAM M. BRADSHAW.

Witnesses:
OTTO S. SCHAIRER,
BIRNEY HINES.